March 18, 1952  J. O. HRUBY, JR  2,589,942
NOZZLE
Filed March 8, 1949
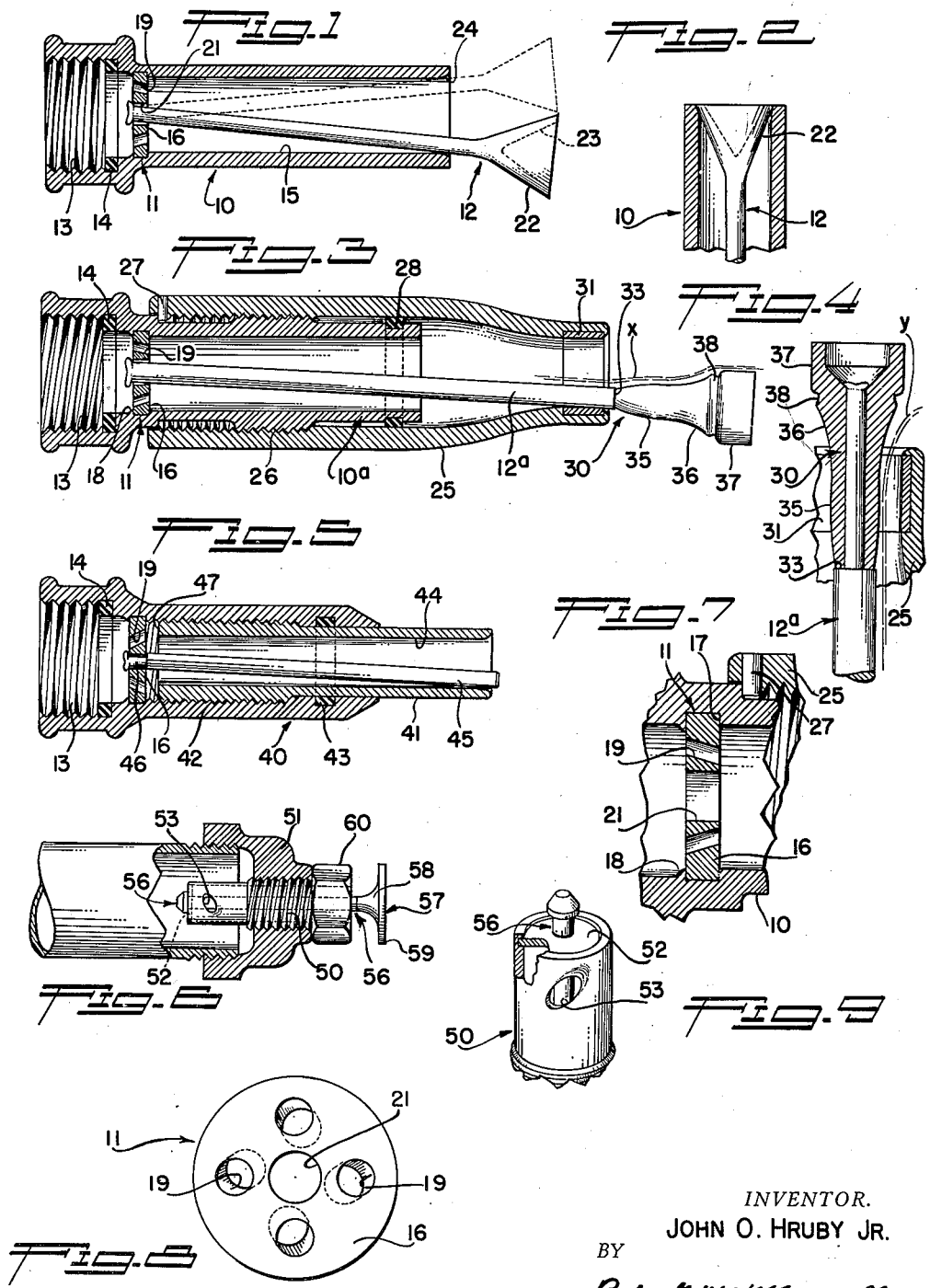
INVENTOR.
JOHN O. HRUBY JR.
BY
Robert W. Maxwell
Attorney Patented Mar. 18, 1952

2,589,942

UNITED STATES PATENT OFFICE 2,589,942

NOZZLE

John O. Hruby, Jr., Glendale, Calif.

Application March 8, 1949, Serial No. 80,287

6 Claims. (Cl. 299—126)

This invention relates to liquid discharge devices and relates more particularly to nozzles suitable for use on garden hoses, sprinkler systems, etc.

While the present invention is capable of embodiment in fluid fuel burners, shower heads, fire nozzles, and the like, it is believed to have its principal application to nozzles and spray heads for garden hoses, irrigation systems and the like. Accordingly I will herein refer to the invention as relating to nozzles and spray devices for such uses, although it will be understood that this is merely one typical field of utility of the invention.

Several general classes of hose nozzles have been introduced including the type having a longitudinally adjustable nozzle sleeve provided with a restricted discharge orifice which cooperates with a stationary headed stem to produce a variable area nozzle opening and thereby obtain a spraying action. The variable area opening has a small average or mean capacity and therefore creates considerable back pressure on the garden hose; furthermore, the water spray thus obtained is annular and flaring, leaving a major circular area which receives practically no water. When a nozzle of the type just mentioned is adjusted to produce a straight stream, the velocity of the water is so great that it is destructive and, when adjusted to give a wide fan-like spray, a virtual mist is ejected that is of little real value in watering the plants. The conventional sprinkler heads used in irrigation systems and the "rose" type of non-adjustable hose sprinklers have one or more discharge orifices shaped to either produce a fan-shaped flaring fountain action that does not distribute the water evenly or to eject individual small diametered streams of water. In either case, the water is not well distributed and excessive back pressures are produced which are damaging to the hoses. A third general class of sprinklers in extensive use includes the rotary sprinklers employing sprinkler arms rotated by reason of the propulsive reaction derived from the discharging angular streams of water. This latter class of device is rather complicated and therefore costly and also creates considerable back pressure without accomplishing a proper distribution of the water.

It is an object of the present invention to provide nozzles and spray heads that overcome most, if not all, of the shortcomings of prior devices of this general type. The nozzle devices of this invention may be constructed to create practically no back pressure and to provide an extensive substantially uniform distribution of the water. The nozzles do not depend for their operation on the ejection of water through small-capacity orifices and therefore do not cause back pressures in the hoses or supply pipes, and the velocities of the spray are not sufficiently great to injure the plants or soil even during large volume spraying. Furthermore, the nozzles of this invention do not necessitate the use of discharge orifices of special configuration or that produce excessively fine sprays or mists. In accordance with my invention, the water is discharged from a simple round or cylindrical pipe-like part and the spray is made up of medium large drops, closely resembling rain, which uniformly cover a wide area, as distinguished from the annular fan-like high velocity streams of the prior art.

Another object of the invention is to provide a nozzle device embodying a simple, effective means for obtaining a well distributed rain-like discharge of water drops with a minimum of resistance to flow and therefore with a minimum of back pressure and velocity increase. I have discovered that by imparting a rotary or angular motion to the stream of water as it flows through the simple nozzle, I transmit a rotary or gyratory motion to a pivoted or loosely restrained stem extending outwardly in the nozzle and that the rotary motion of the water stream, coupled with the action of the gyrating stem in the stream, causes the water to break into relatively large well distributed drops which leave the nozzle at low velocities. Thus the spray action is not dependent upon an abrupt increase in the velocity of the stream as in the prior devices nor does it necessitate the rather complicated and expensive equipment usually employed in the so-called "rotary" sprinklers. The gyrating stem breaks up the stream into rain-like drops even during large volume relative low velocity flow so that a maximum of fully available water may be delivered to the plants.

It is another object of the invention to provide a sprinkler or nozzle of the kind described that is readily adjustable to produce a substantially straight stream of water drops or a diverging spray of selected diameter. A simple manual adjustment or regulation is all that is required to change the area or size of the spray. This adjustment does not result in the mist-like spray that is often produced by the prior adjustable nozzles and which is largely lost through evaporation, particularly in the hotter, drier climates. With my nozzle or sprayer, the drops remain large and rain-like with the various settings or adjustments so as to be available for wetting the soil with a minimum of evaporation.

It is another object of the invention to provide nozzles of the class described in which heads of various configurations may be provided on the gyratory stem to produce spray stream of selected shapes, patterns, sizes and directions.

It is a further object of the invention to provide a nozzle of the character described wherein the adjustment is obtained by controlling the means for imparting the rotary or annular motion to the water stream. In one form of my invention an abutment or stream-diverting surface is adjustable toward and away from the angularly directed passages which give the water its rotary motion, thereby changing the angle of rotation and the resultant spray action.

A further object of the invention is to provide a sprayer or nozzle of the class referred to in which the adjustable nozzle sleeve is movable with respect to a specially shaped head on the gyratory stem to alter or regulate the shape and character of the discharging stream. In this form of my invention the head on the gyratory stem, in addition to breaking up the water into drops, serves as a spray-shaping member.

A still further object of the invention is to provide a nozzle or spray device that is of extremely simple construction and therefore inexpensive to manufacture. The device may be constructed to require a minimum of simple, readily machined or formed parts that may be easily assembled.

Other objectives and features of the invention will become apparent from the following detailed description of several typical preferred embodiments, throughout which description reference will be made to the accompanying drawings, in which:

Figure 1 is a longitudinal sectional view of one form of the invention with the stem element appearing in side elevation;

Figure 2 is a fragmentary sectional view of the outer portion of the device illustrated in Figure 1 showing the manner in which the device may be arranged in a vertical position when employed as a stationary sprinkler head;

Figure 3 is a view similar to Figure 1, illustrating another form of the invention;

Figure 4 is an enlarged fragmentary view of the outer portion of the stem element of the nozzle shown in Figure 3 with the head appearing in longitudinal cross section;

Figure 5 is a view similar to Figure 1, showing another embodiment of the invention;

Figure 6 is a view similar to Figure 1, illustrating still another form of the invention;

Figure 7 is an enlarged fragmentary sectional view illustrating the means for imparting angular motion to the fluid stream, which means is incorporated in the devices of Figures 1, 3 and 5;

Figure 8 is an enlarged plan elevation of the disk for imparting rotary motion to the fluid; and Figure 9 is an enlarged fragmentary perspective view of a portion of the nozzle illustrated in Figure 6 showing the openings or slots for giving the fluid stream its angular motion.

The nozzle of the invention illustrated in Figures 1, 7 and 8 includes generally a nozzle body 10, means 11 for imparting angular or rotary motion to the fluid flowing through the body, and an element 12 caused to rotate or gyrate by the angular motion of the fluid, to break up the stream into a spray of drops.

The construction and proportions of the body 10 depend to a large extent upon the intended application or use of the device. Thus where the device is to be used as a garden hose nozzle, the body 10 may be an elongate tubular member enlarged at its inner end to have a threaded socket 13 for facilitating connection with the hose. The customary rubber washer 14 is seated against the inner wall of the socket 13. The major portion of the body 10 is a simple tubular part which may be of substantially uniform internal and external diameter from adjacent the socket 13 to the outer extremity of the body. Thus, as illustrated, the major bore or opening 15 of the body 10 is of round cross section and of uniform diameter from adjacent the socket 13 to the outer end of the body. In this connection I have found that any abrupt change in diameter of the opening 15, such as an internal shoulder in the body, interferes with the rotation of the water stream and thus may prevent the gyratory motion of the element 12.

The means 11 for imparting rotation or angular movement to the fluid stream may take various forms. In the simple construction illustrated the means 11 comprises a perforated partition or disk 16 arranged across the interior of the tubular body 10 adjacent the socket 13. The disk 16 may be a separately formed part appropriately secured in the body. In the particular construction illustrated the disk 16 has one side engaged against an internal shoulder 17 in the body 10 and the material or metal of the body is deflected or driven inwardly at spaced points 18 to engage the other side of the disk and thereby secure the disk in place. The disk 16 has a plurality of spaced openings or ports 19 arranged to direct the fluid stream in a manner so as to rotate as it flows out through the body 10. The ports 19 are arranged in an annular series and are pitched or inclined both tangentially and radially, having longitudinal axes that are tangent to a circle concentric with the longitudinal axis of the body and sloping forwardly and inwardly toward said axis. This is clearly illustrated in Figures 7 and 8. It will be seen that water flowing through the ports 19 is given a spiral or angular direction and accordingly rotates as it moves outwardly through the nozzle. The aggregate capacity of the ports 19 is considerable so that the disk 16 does not create any appreciable back pressure in the hose, and the disk is of substantial thickness so that the ports 19 are sufficiently long to be effective in giving the water stream its angular motion.

The element 12 and its rotary or gyratory motion are features of the invention. The element 12 is in the nature of a rod or stem extending longitudinally through the major portion of the body 10 and mounted at its inner end in such a manner that it is free to rotate or gyrate. In the simple preferred construction the stem element 12 is carried by the disk 16, being arranged through a central opening 21 in the disk. The inner end of the stem-like element 12 may be upset or enlarged to cooperate with the rear face of the disk 16 so as to prevent outward displacement of the element. However, as illustrated, the element 12 loosely fits the opening 21 so that it is free to oscillate or gyrate at will. It is to be observed that the disk 16 serves to carry the element 12 as well as to impart the angular motion to the water stream. The stem element 12 is of small diameter in comparison with the diameter of the body opening 15 so that it does not materially obstruct the fluid flow and extends forwardly to project beyond the outer end of the body. In the form of the invention being described the gyratory element 12 is provided at its outer end with an enlargement or head 22. The head 22 is conical to present an outwardly flaring surface that is contacted by the water discharging from the nozzle and it is preferred to form a rather deep depression 23 in the forward or outer end of the head to reduce its weight. The maximum diameter of the head 22 is greater than the diameter of the body opening 15 so that the head is adapted to engage the body 10 to limit the inward or rearward travel of the element 12.

In the operation of the nozzle illustrated in Figure 1, the body 10 is secured to a hose or pipe in the usual manner. When the water is discharged from the nozzle it is obliged to pass through the angular ports 19 which gives the water stream a helical or angular motion. This motion of the stream flowing through the body opening 15 causes the stem element 12 to rotate or gyrate, the stem bearing or riding on the forward internal corner 24 of the body 10 and more or less following around on this corner surface. In actual practice the person holding the nozzle distinctly senses or feels the motion and vibration set up by the gyrating stem element 12. The speed or rate of this motion is dependent to a large extent upon the velocity and volume of the fluid flow, although the element 12 gyrates even during relatively low volume and relative low velocity flow. The gyrating element 12 and its head 22 operate to interrupt and break up the spiralling water stream in such a manner that the water discharges from the nozzle in well distributed drops. These drops are substantially evenly distributed throughout the field or radial range of the spray and are not projected in an annular cone, as formed by many of the prior nozzles. Further, the device does not create a fine mist, to be largely lost through evaporation, but forms drops of considerable size which effectively wet the vegetation and soil. The velocity of the stream is not appreciably increased by the nozzle and therefore the water flows from the nozzle without excessive velocity. This is important because it permits a large volume distribution of the water without injuring the plants or soil. As the nozzle offers a minimum of resistance to flow, it creates practically no back pressure in the hose or supply pipe, permitting a maximum delivery of water in a minimum of time.

Figure 2 illustrates another manner of employing the device of the invention. In this case the body 10 is coupled with a pipe or other source of water supply (not shown) and is arranged in a vertical position so that the head 22 is at its upper end. When no water is discharging, the stem element 12 is in the position shown where the head 22 closes the upper end of the body 10 to prevent the entrance of dirt and foreign matter into the nozzle. Upon supplying water under pressure to the nozzle, the stem element 12 is raised and is gyrated as above described to produce a broken-up stream of drops. Again, when the water is turned off, the head 22 drops by gravity to close the nozzle. Thus the nozzle forms an effective "pop-up" sprinkler head that is closed and retracted when not in use and that automatically becomes operative by merely delivering water under pressure to it.

Figures 3 and 4 illustrate an adjustable nozzle of my invention. In this device the nozzle body 10a is substantially the same as the body 10 and the means 11 for imparting rotation to the water stream may be the same as the means 11 described above. The body 10a carries a longitudinally adjustable sleeve or extension 25 in the nature of a tubular part engaging around the major portion of the body and extending beyond its outer end. In the arrangement illustrated the extension 25 is adjustably screw threaded on the body 10a, the two parts having mating screw threads 26. The axial adjustment of the extension 25 may be limited by a pin 27 on the extension 25 engageable with the enlarged socket end of the body 10a and the body thread 26. A suitable packing means 28 is provided to seal between the body 10a and extension 25. The outer portion of the extension 25 gradually lessens in diameter in the forward direction so that its outer end part is of approximately the same internal diameter as the body 10a.

The nozzle of Figures 3 and 4 further includes a gyratory element 12a in the form of an elongate stem provided at its outer end with a head 30. The stem element 12a is loosely or rotatably secured in the disk 16 in the same manner as the above-described element 12 and is sufficiently long to extend beyond the outer end of the extension 25. A wear-taking bushing 31 of phenol formaldehyde resin plastic, or other appropriate material, may be set in an internal groove in the outer portion of the extension 25 to constitute an annular bearing surface for the element 12a as it rotates.

The head 30 is of special external configuration to provide for the projection of streams or sprays of different shapes. The head 30 may be a tubular part engaged on a reduced end portion of the stem 12a to have its inner end abut against a shoulder 33 on the stem. The outer extremity of the reduced stem part may be headed over or upset, as illustrated in Figure 4, to secure the head 30 on the stem. The extreme inner end of the head 30 is preferably of slightly less diameter than the shoulder 33 so that there is no inwardly or rearwardly facing obstruction to disturb or laterally deflect the boundary layer of water moving outwardly along the stem. The rear portion of the head 30 has a slightly bulging or convex surface 35 which gradually merges with an outwardly and forwardly flaring surface 36. The outer portion of the head 30 has a cylindrical surface 37 of slightly enlarged diameter separated from the flaring surface 36 by a step or shoulder 38.

When the adjustable extension 25 is in a retracted or inner position such as illustrated in Figure 3, a portion of the stream of water flowing past the gyrating head 30 closely follows the surfaces 35 and 36. However, before reaching the groove 38 the water breaks free from the head 30 and travels in a forward direction to flow along the cylindrical surface 37. This is indicated by the lines X in Figure 3. It is to be understood that only a portion of the water stream closely follows the surfaces of the head 30 and the remainder of the water is broken up into drops and discharged forwardly and somewhat laterally to effect an even distribution of the spray. When the extension 25 is in an advanced or forward position, so that the rear portion of the head 30 operates within the extension 25, the water stream follows along the surfaces 35 and 36 and then rather abruptly passes laterally and forwardly from the surface 36, i. e., it sprays laterally and forwardly from between the surface 36 and the wall of the extension 25 as illustrated by the lines Y in Figure 4. Thus by merely rotating the extension 25 so as to advance or retract it relative to the body 10ª, the character and shape of the water spray may be altered at will. It is to be understood that the gyratory stem element 12ª and its head 30 gyrate, by reason of the rotating water stream, to break the water column into a stream of drops as in the previously described form of the invention.

Figure 5 illustrates another form of adjustable nozzle wherein the variation or adjustment of the spray is effected by regulating the action of the means 11 for imparting the angular motion to the water stream. The body 40 of this nozzle is similar to the body 10 described above, being a tubular member provided at its inner or rear end with a threaded bell or socket 13, or the equivalent, for facilitating connection with a hose or pipe. The means 11 may be the same as described previously, comprising the disk 16 secured in the body 40 adjacent the socket 13 and provided with the angular tangential ports 19. However, I have shown the ports 19 directed tangentially and pitched outwardly and forwardly. As will be later described, the ports 19 may be pitched either inwardly and forwardly or outwardly and forwardly. In this form of the invention the adjustable member is in the nature of a tubular sleeve or extension 41 extending into the body 40 from its outer end and adjustable axially relative to the body. The means for effecting this longitudinal adjustment preferably consists of mating screw threads 42 on the interior of the body 40 and the exterior of the extension 41. Sealing or packing means 43 is carried by the body 40 to seal about the extension 41. The extension 41 is sufficiently long to project beyond the outer end of the body so as to constitute the discharge element of the nozzle and to be conveniently accessible for manual engagement. The bore or opening 44 of the extension 41 may be of uniform diameter throughout, as illustrated. The gyratory element 45 in this form of the invention is a simple rod or stem engaged in the central opening 21 of the disk 16 so as to be free for rotary and angular movement. In the drawings I have shown a reduced part 46 of the stem element 45 loosely engaged in the opening 21 with its end upset to prevent detachment of the element. The stem element 45 is sufficiently long to project slightly beyond the outer end of the extension 44. I have found that in this form of the invention a head for the element 45 is not necessary and the forward end of the element may be plain, as illustrated.

The inner end 47 of the adjustable extension 41 is preferably flat and substantially normal to the longitudinal axis of the assembly and is in spaced opposing relation to the forward side of the disk 16. Thus the end face 47 of the extension 41 opposes the angular ports 19. I have discovered that by adjusting the end face 47 toward and away from the disk 16, the character of the water spray or stream may be regulated at will. That is, by screwing the extension 41 inwardly and outwardly short distances, the spray may be changed from a substantially straight stream of broken-up drops to a broad or extensive spray of distributed drops. Only minor adjustments of the extension 41 are required to produce considerable changes in the shapes, etc., of the spray stream. It is believed that this adjusting action is caused by the angle-changing influence of the end face 47 which serves to divert the water stream at different angles with the extension 41 in different axial positions. Where the ports 19 are pitched inwardly and forwardly, an inward or rearward adjustment of the extension 41 produces a flaring or fan-shaped spray and forward or outward adjustment of the extension 41 results in a straighter stream or spray. I have found that this adjusting effect may be reversed by pitching the tangential ports 19 outwardly and forwardly as distinguished from the inward and forward direction of inclination. Thus where the ports 19 are pitched or directed outwardly and forwardly, as illustrated in Figure 5, a rearward adjustment of the extension produces a relatively straight spray stream and a forward adjustment of the extension 41 results in a fan-like flaring spray. The invention contemplates pitching of the ports 19 either inwardly and forwardly or outwardly and forwardly, as desired. I have observed that when the tangential ports 19 are directed forwardly and outwardly, the water stream more closely follows the wall of the bore 44 and the surface of the stem element 45 and this construction may be preferred. The gyrating stem element 45 serves to break up the water into well distributed drops as in the other forms of the invention, the stem constantly rotating or gyrating during operation of the nozzle.

The nozzle illustrated in Figures 6 and 9 is characterized by a different means for imparting the angular or rotary motion to the water. In this construction the nozzle body 50 is an integral tubular part having its inner end portion threaded into a pipe reducer 51 which in turn may be threaded on a pipe. The body 50 extends forward from the reducer 51 and has a polygonal head 60 on its outer end adapted to be engaged by a wrench, or the like, to facilitate installation. The tubular body 50 projects a considerable distance rearwardly into the socket or reducer 51 and a plate or cap 52 closes the rear end of the body. The rear extremity of the body 50 may be spun over to secure the cap 52 in place.

The means for imparting rotation to the water as it enters the body 50 comprises one or more openings 53 in the wall of the rearwardly projecting portion of the body. These openings 53 connect the interior of the body 50 with the interior of the reducer 51 which in turn receives the water under pressure from the pipe or hose, as shown. In the case illustrated there are two diametrically opposite openings 53 and the openings are generally round, it being understood that they may be of other shapes. The openings 53 are directed both tangentially and at an angle to the radial. The two openings 53 are pitched forwardly and inwardly and have the same angular or tangential direction. It will be seen that water flowing inwardly through the openings 53 is given a rotary motion or angular motion so as to rotate as it travels outwardly through the body 50. It is preferred to proportion the openings 53 to have a substantial fluid capacity so that the nozzle offers practically no back pressure. It is to be observed that the openings 53 are not readily clogged or obstructed by small stones or other objects and because the openings 53 are in the body portion extending into the reducer 51, or pipe, and are located near the inner extremity of the body, a trap is left or defined outwardly of the openings to receive sediment and solid matter particles. These features, coupled with its extreme simplicity, particularly well adapt this form of the invention for stationary irrigation installations.

The gyratory element 56 of the nozzle illustrated in Figure 6 is an elongate stem passing axially through the body 50 and provided at its outer end with a head 57. The stem 56 is freely engaged in a central opening in the plate or cap 52 and its end is upset to prevent axial displacement of the stem. The stem element 56 is sufficiently long to project forwardly beyond the end of the body 50, and the head 57 is formed or secured on the forward end of the stem. The head 57 has a conical part 58 presenting an outwardly and forwardly curved and flaring surface and has a radially projecting annular deflector lip 59 which extends from the outer end of the conical part. The element 56 and its head 57 operate in the same manner as the previously described gyratory elements, being rotated or gyrated by the spiralling stream of water, and this gyration, together with the rotary motion of the water, effectively breaks the water stream into well distributed drops. The conical surface 58 deflects the water in a forward and lateral direction while the lip 59 directs the water laterally. This type of deflector head is desirable when the spray is to be directed horizontally from a vertically positioned nozzle; for example, in orchards where it is undesirable to wet the foliage of the trees.

It is to be understood that the heads 22 and 30 of Figures 1 and 3 may be used on the gyratory element 56 of Figure 6 and in a like manner the head 57 may, if desired, be installed on the stem elements 12 and 12ª in place of the previously described heads.

Having described only typical preferred forms of my invention, I do not wish to be limited to the particular details set forth, but wish to reserve to myself any variations that may fall within the scope of the following claims.

I claim:

1. A nozzle comprising a tubular body provided at its inner end with means for connection with a source of liquid under pressure, the outer end of the body being open for the discharge of the liquid, a stem arranged longitudinally in the body to extend from said outer end thereof, means supporting the stem at a point spaced inwardly from said outer end of the body for limited axial movement and for free pivotal movement about said point so that the stem may ride against the internal surface of the tubular body adjacent its outer end, a liquid deflecting head on the outer end of the stem having an external diameter greater than the internal diameter of the body so as to be capable of closing the outer end of the body, the stream of liquid flowing through the body being adapted to move said head outwardly from the end of the body, and means in the body for imparting rotational movement to said stream so that the stem is caused to ride against said surface of the body and the stem and head are moved about said point to break up the stream as it issues from the body.

2. A spray producing device comprising a body having an opening therethrough, the inner end of the opening being adapted to receive fluid under pressure and the outer end of the opening being adapted to discharge the fluid, a stem arranged longitudinally in the opening to extend to the outer portion thereof, support means in the body supporting the stem at a point spaced inwardly from said outer end of the opening for lateral swinging about said point while inclined relative to the longitudinal axis of the body so as to lean against and roll around on the internal surface of the body adjacent its outer end, and means for imparting angular motion to the fluid flowing through said opening so that the flowing fluid swings the stem around said point to break up the stream of fluid issuing from the outer end of the opening.

3. A spray producing device comprising a body having an opening therethrough, the inner end of the opening being adapted to receive fluid under pressure and the outer end of the opening being adapted to discharge the fluid, a stem of considerably smaller diameter than the opening arranged longitudinally in the opening to extend to the outer portion thereof, support means in the body supporting the stem at a point spaced inwardly from said outer end of the opening for free pivotal movement about said point while inclined with respect to the longitudinal axis of the opening so that the stem may tilt against and ride on the wall of said opening adjacent the outer end thereof, and aperture means in the body for directing the fluid in a spiral course through said opening so that the fluid produces movement of the stem along said wall of the opening to break up the stream of fluid issuing from the outer end of the opening.

4. A fluid discharge device comprising a body having a fluid opening, one end of the opening serving to discharge a stream of fluid under pressure, a stem having an external diameter appreciably smaller than the diameter of the opening and arranged longitudinally in the opening, means supporting the stem in the body at a point spaced inwardly from said end of the opening for free gyration about said point while inclined relative to the longitudinal axis of the opening, and means for imparting rotary motion to the stream of fluid flowing through the opening so as to gyrate the inclined stem to break up the discharging stream.

5. A fluid discharge device comprising a body having a fluid opening, one end of the opening serving to discharge a stream of fluid under pressure, a stem having an external diameter smaller than the diameter of the opening and arranged longitudinally in the opening, means in the body loosely supporting the stem at a point spaced a substantial distance inwardly from said end of the opening to freely gyrate about said point while inclined with respect to the longitudinal axis of the opening and while riding along the wall of said opening at said end thereof, and means associated with the first-named means for imparting a rotary motion to the stream of fluid flowing through the opening to impart such gyration to the inclined stem so that the latter breaks up the discharging stream.

6. A fluid discharging device comprising a tubular body, the inner end of the body receiving fluid under pressure, the outer end of the body discharging the fluid, a stem arranged longitudinally in the body to be within the stream of fluid flowing therethrough and extending from the outer end of the body, means loosely securing the stem in the body for free pivotal movement about a point spaced a substantial distance inwardly from the outer end of the body while inclined with respect to the longitudinal axis of the body so as to lean against the wall of the opening adjacent the outer end thereof as it pivots, a fluid-deflecting head on the outer end of the stem, and wall means in the body having angular ports for imparting a rotary motion to the fluid flowing therethrough to pivot the inclined stem and its head so as to break up the stream issuing from the body.

JOHN O. HRUBY, JR.

REFERENCES CITED

The following references are of record in the file of this patent:

UNITED STATES PATENTS

| Number | Name | Date |
|---|---|---|
| 272,684 | Hall | Feb. 20, 1883 |
| 1,007,793 | Peabody | Nov. 7, 1911 |
| 1,018,310 | Frey | Feb. 20, 1912 |
| 1,140,259 | Elliott et al. | May 18, 1915 |
| 1,764,570 | Lohman | June 17, 1930 |
| 1,816,645 | Giordano | July 28, 1931 |
| 1,862,381 | Le Moon | June 7, 1932 |
| 1,968,126 | Center | July 31, 1934 |
| 2,235,834 | Gillette et al. | Mar. 25, 1941 |

FOREIGN PATENTS

| Number | Country | Date |
|---|---|---|
| 22,161 | Australia | Sept. 2, 1929 |